(12) United States Patent
Tsutsumi et al.

(10) Patent No.: US 7,043,688 B1
(45) Date of Patent: May 9, 2006

(54) DOCUMENT PROCESSING APPARATUS CAPABLE OF INCREASING PRINTING EFFICIENCY BY FORMING VIRTUAL DOCUMENT AND STORAGE MEDIUM

(75) Inventors: Katsunori Tsutsumi, Kunitachi (JP); Eiji Hatano, Musashimurayama (JP); Yukihiro Shindo, Fussa (JP); Koji Tamura, Higashiyamato (JP); Takayasu Watanabe, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/449,699

(22) Filed: Nov. 24, 1999

(30) Foreign Application Priority Data

Dec. 22, 1998 (JP) ................................. 10-365309
Dec. 24, 1998 (JP) ................................. 10-367795

(51) Int. Cl.
*G06F 15/00* (2006.01)
*G06F 17/30* (2006.01)

(52) U.S. Cl. ..................... 715/517; 715/520; 715/530; 358/1.15; 358/1.16; 358/1.17; 358/1.18

(58) Field of Classification Search ................ 715/517, 715/520, 530, 539; 358/1.15–1.18
See application file for complete search history.

(56) References Cited

U.S. PATENT DOCUMENTS

| | | | | |
|---|---|---|---|---|
| 5,371,837 A | * | 12/1994 | Kimber et al. ............. | 358/1.15 |
| 5,379,373 A | * | 1/1995 | Hayashi et al. ............. | 715/513 |
| 5,459,826 A | * | 10/1995 | Archibald ................... | 715/517 |
| 5,588,103 A | * | 12/1996 | Aoyagi ....................... | 345/745 |
| 5,619,623 A | * | 4/1997 | Takayanagi et al. ....... | 358/1.15 |
| 5,859,711 A | * | 1/1999 | Barry et al. ................ | 358/296 |
| 5,995,723 A | * | 11/1999 | Sperry et al. .............. | 358/1.15 |
| 6,182,096 B1 | * | 1/2001 | Mastie et al. .............. | 715/517 |
| 6,247,011 B1 | * | 6/2001 | Jecha et al. ................ | 707/9 |
| 6,327,599 B1 | * | 12/2001 | Warmus et al. ........... | 715/517 |

(Continued)

FOREIGN PATENT DOCUMENTS

JP       59-191685 A      10/1984

(Continued)

OTHER PUBLICATIONS

Microsoft Press Computer Dictionary, 3rd Edition, 1997 Microsoft Corporation, p. 156.*

(Continued)

*Primary Examiner*—William Bashore
(74) *Attorney, Agent, or Firm*—Frishauf, Holtz, Goodman & Chick, P.C.

(57) ABSTRACT

When a document is printed and this document contains plural sorts of data such as a document, a presentation material, and a drawing, a virtual document is formed by which these plural data can be printed in a batch mode in a document processing apparatus. A printing operation is carried out in accordance with a print control content of this virtual document. To this end, the document data having various formats and formed by using a plurality of application programs are converted into page document data to be outputted in a common format. This page document data is SPOOL-stored. Such a virtual document file is formed among these output page document data SPOOL-stored. A designation sequence and an output sequence are set to these virtual document files. As a result, the document data can be outputted in accordance with the designated output sequence, which is designated by the SPOOL-stored output page document data, by merely designating this virtual document file.

6 Claims, 15 Drawing Sheets

U.S. PATENT DOCUMENTS

| | | | |
|---|---|---|---|
| 6,338,076 B1 * | 1/2002 | Hidding et al. | 715/530 |
| 6,470,363 B1 * | 10/2002 | Kanerva et al. | 715/530 |
| 6,480,866 B1 * | 11/2002 | Mastie | 715/525 |
| 6,552,813 B1 * | 4/2003 | Yacoub | 358/1.1 |
| 6,850,335 B1 * | 2/2005 | Barry et al. | 358/1.15 |

FOREIGN PATENT DOCUMENTS

| | | |
|---|---|---|
| JP | 61-149361 A | 7/1986 |
| JP | 08-258380 A | 10/1996 |
| JP | 09-226190 A | 9/1997 |
| JP | 10-124270 A | 5/1998 |

OTHER PUBLICATIONS

Harris, Stephen L., Managing Virtual Documents: Correctness by Design, Oct. 1997, Proceedings of the 15th annual international conference on Computer documentation, ACM Press, pp. 131-135.*

Harris, Stephen L. et al., Real information, virtual documents, Feb. 1996, Proceedings of the 13th annual international conference on Systems documentation: emerging from chaos: solutions for the growing complexity of our jobs, ACM Press, pp. 71-76.*

* cited by examiner

PAGE ADDING RANGE

MASKING RANGE

DOCUMENT PROCESSING APPARATUS CAPABLE OF INCREASING PRINTING EFFICIENCY BY FORMING VIRTUAL DOCUMENT AND STORAGE MEDIUM

BACKGROUND OF THE INVENTION

1. Technical Field

The present invention generally relates to a virtual document processing apparatus for editing various sorts of data such as documents and tables to form documents, and a recording medium for recording a control program of the virtual document processing apparatus. More specifically, the present invention is directed to such a document processing apparatus capable of effectively printing out documents by forming virtual documents SPOOL files (virtual documents), and further directed to a recording medium for recording a control program used to control such a virtual SPOOL file processing apparatus.

2. Description of the Related Art

Very recently, for example, in office computers and general-purpose computers, various sorts of application programs are utilized such as database and spreadsheet programs. On the other hand, various sorts of application programs such as spreadsheet programs and database are used in order to form documents distributed in a meeting, documents prepared for representations, and documents containing presentation materials and drawings.

In the case that such a document is printed out, for instance, when a document is printed out, an application program such as a wordprocessor program is initiated to expand document data to be printed out. After a page number of the document to be printed out is designated on a print dialog screen, a print instruction is entered. Thus, the document data to be printed out is transferred to a designated printer driver program saved in a system from an application program. This document data is converted into command data of a designated printer, and then, the converted document data is outputted to this designated printer so as to be printed out.

As a consequence, in such a case that one document contains plural sorts of data such as a document, a presentation material, and a drawing, plural sorts of application programs corresponding to the respective data are separately initiated. Thereafter, a series of the above-explained printing process operations must be repeatedly carried out.

However, while such a conventional printing process operation is carried out, in such a case that one document contains plural sorts of data such as a document, a presentation material, and a drawing, plural sorts of application programs corresponding to the respective data are separately initiated. Thereafter, a series of the above-explained printing process operations must be repeatedly carried out. Also, since no serial page number is applied to the printed matters produced in accordance with the various application programs, operators must manually rearrange these printed matters in accordance with a serial number. As a result, there is a problem that very cumbersome printing works/operations are necessarily required even when only one document is printed out. In particular, when plural sets of documents must be prepared, very lengthy working time is required to rearrange the printed matters in a serial number, and the printing efficiency is lowered.

SUMMARY OF THE INVENTION

The present invention has been made to solve the above-explained problems, and therefore, has an object to provide a document processing apparatus capable of increasing a printing efficiency when a document containing plural sorts of data such as a document, a presentation material, and a drawing is printed out. That is, a virtual document by which plural sorts of print data can be printed out in a batch mode is formed.

In the document processing apparatus, when a converting means converts a plurality of documents formed by an application program into page document data to be outputted every page, a storage means SPOOL-stores each of the page document data converted by that converting means. When an output-subject setting means designate desirable page document data as output-subject document data SPOOL-stored in this storage means, and sets an output condition when each of the designated output-subject document data is outputted, an output control means outputs page document data designated from the respective page document data SPOOL-stored in the storage means based on the contents designated/set by this output-subject setting means in accordance with the output condition.

As a consequence, such a cumbersome operation can be deprived from the operator's work in which the operator initiates the application program every document page and must set the printing condition. As a result, the work sequence during the printing operation can be simplified, and the print work efficiency can be improved.

Also, another cumbersome operation can be omitted, in which the application programs are initiated and the print setting operations are performed every time each of the document pages formed from plural different application programs is processed. Thus, the printing work sequence of the document can be further simplified, resulting in a higher work efficiency.

Also, while cumbersome setting operation required to output the document is omitted, the document can be printed out by merely designating the virtual document file.

Also, since the page information is newly added to each of the virtual SPOOL pages by masking the original page, a serial page number can be simply applied. The cumbersome operation in which the page sequence of the printed matters is rearranged can be omitted.

Furthermore, when the actual printing operation is carried out, the printed matter can be outputted by merely reading the corresponding page document. Therefore, the process time required for the actual printing operation can be shortened.

Also, the operator can simply judge as to whether or not the changed contents of the original document are combined with each other to be managed, and the combined document content is reflected on the document.

BRIEF DESCRIPTION OF THE DRAWINGS

A more better understanding of the present invention is made of a detailed description to be read in conjunction with the accompanying drawings, in which.

DETAILED DESCRIPTION OF THE PREFERRED EMBODIMENTS

Referring now to drawings, various preferred embodiments of the present invention will be described more in detail.

FIG. 1 to FIG. 15 represent a computer system to which a virtual document processing apparatus according to a preferred embodiment of the present invention is applied.

Major Arrangement of Computer System

Figure 1:
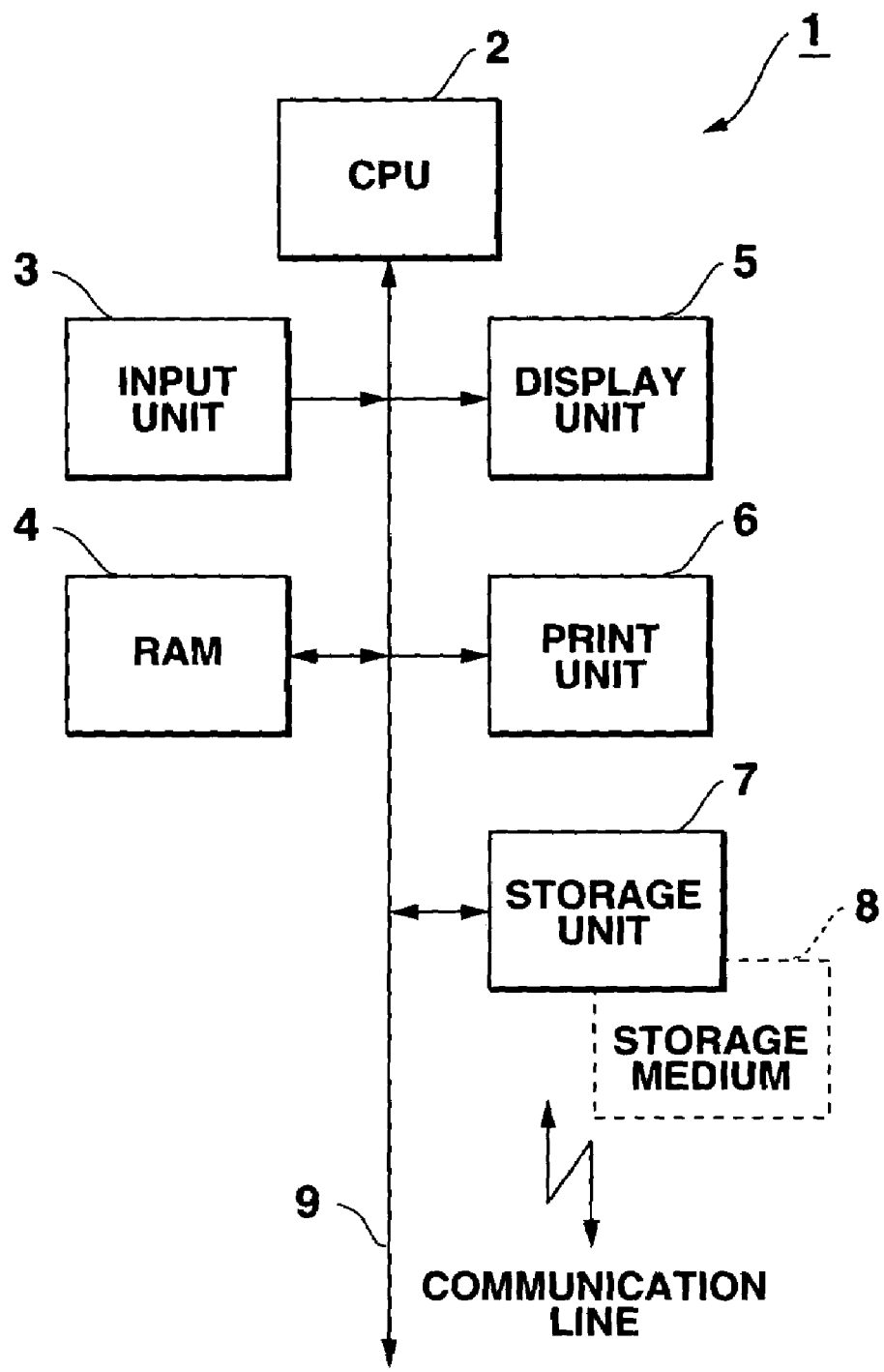
FIG. 1 is a schematic block diagram for indicating a major circuit arrangement of a computer system 1 according to an embodiment mode of the present invention.

FIG. 1 schematically shows a major arrangement of a computer system 1 accomplished in accordance with this embodiment of the present invention.

As indicated in FIG. 1, this computer system 1 is arranged by a CPU (central processing unit) 2, an input device 3, a RAM (random access memory) 4, a display unit 5, a print unit 6, a storage unit 7, and a storage medium 8. All of the above-described units other than the storage medium 8 are connected via a bus 9 to each other.

The CPU 2 may execute various sorts of processing operations, may save processed results to the RAM 4, and also may display the saved results on the display unit 5. Concretely speaking, this CPU 2 expands a system program stored in the storage unit 7, and also an application program designated from various sorts of application programs in correspondence with this computer system 1. The CPU 2 temporarily saves various sorts of instructions entered from the input unit 3 into this computer system 1, and/or data into the RAM 4. Then, the CPU 2 executes the various sorts of process operations in response to this entered instruction and the input data. Then, the processed result saved in the RAM 4 is stored into a storage area within the storage unit 7. This storage area is instructed by the input unit 3.

Further, when the CPU 2 prints a document containing plural sorts of data such as a document, a presentation material, and a drawing, this CPU 2 may execute a document printing process operation (see FIG. 3) based upon a control conception diagram of a document printing operation indicated in FIG. 2 (will be discussed later).

In other words, in such a case that a virtual printer used to form a virtual SPOOL (simultaneous peripheral operation online) file "C" (will be explained later) is designated when the document printing process operation is carried out, the CPU 2 calls a virtual printer driver from the storage unit 7. When a page to be printed out is designated from a document file (document, presentation material, and drawing etc.) depending upon application programs AP-1 to AP-3 (will be referred to as "applications AP-1 to AP-3" hereinafter), the CPU 2 expands each of page data of the respective applications AP-1 to AP-3 to a drawing record in unit of a page so as to form a virtual SPOOL page record. The respective virtual SPOOL page records store, as a virtual SPOOL file C, the respective virtual SPOOL page records into an application-depending SPOOL file folder B (shown in FIG. 2) in the storage unit 7 in correspondence with the relevant document file, depending upon the respective applications AP-1 to AP-3.

Then, the CPU 2 initiates a virtual document editor program D of FIG. 2 to execute a virtual document editing process operation (see FIG. 6, will be discussed later). The CPU 2 displays a virtual document editor screen (see FIG. 7) on the display unit 5. Thereafter, the CPU 2 executes both a virtual document forming process operation (see FIG. 8) and an editing process operation (see FIG. 9), so that a virtual document management file "E" is formed from each of the virtual SPOOL page records saved in the above-explained virtual SPOOL file C is formed on this virtual document editor screen. Then, the CPU 2 saves this formed virtual document management file E into the virtual document management file folder stored in the storage unit 7. In this virtual document management file E, edited contents are stored as management information. These edited contents correspond to the respective virtual SPOOL page records as names of document files to be edited.

Furthermore, while the virtual document forming process operation is carried out, when "pint preview" is designated on the virtual document editor, this CPU 2 executes a print preview processing operation (see FIG. 12) of the virtual document management file E. Thus, while the designated virtual document page record is displayed as a print preview screen on the virtual document editor screen, the CPU 2 may set/release a masking range (output-suppressing area) in unit of this virtual document page, and also may set an information (page) adding range (information adding area) in unit of this virtual document page.

Also, while the virtual document editing process operation is carried out, when an actual printer used to perform an actual printing process operation is designated, this CPU 2 initiates a virtual print control program F of FIG. 2 to execute a printing process operation (see FIG. 13) (will be discussed later). Then, the CPU 2 reads out a virtual document page record from the virtual document management file E, and also reads out the corresponding virtual SPOOL page record from the virtual SPOOL file C in unit of a page, and furthermore, converts the virtual SPOOL page record into a printer-applicable SPOOL record which corresponds to a designated actual printer, so that a printer-applicable SPOOL file G of FIG. 2 is formed. Then, the printer-applicable SPOOL file G is transferred to the print unit 6 and the printing process operation of this print unit 6 is executed under control of this CPU 2. When this printing process operation is accomplished, the CPU 2 deletes this printer-applicable SPOOL file G, and saves both the virtual SPOOL file C and the virtual document management file E.

The input unit 3 contains a keyboard and a pointing device, and outputs a key-depression signal of a key depressed on the keyboard, and a positional signal of the pointing, device to the CPU 2. The keyboard is equipped with a cursor key, a numeral entry key (numeric keyboard), and various sorts of function keys. The pointing device is realized by a mouse, and so on.

In the RAM 4, a program storage area and a data storage area are formed. In this program storage area, when the CPU 2 executes the above-explained various sorts of application programs, these sorts of programs are expanded. In the data storage area, data and table data are expanded. These data are processed when the CPU 2 executes the above-explained various process operations.

The display unit 5 is constructed of a CRT (cathode-ray tube) and the like, and may display thereon a virtual document editor screen and a print preview screen, which are entered from the CPU 2. The print unit 6 prints out print data (printer-applicable SPOOL file etc.) entered from the CPU 2 on a predetermined recording paper to output the printed paper.

The storage unit 7 contains the storage medium 8 into which a program and data have been previously stored. This storage medium 8 is constructed of a magnetic recording medium, an optical recording medium, or a semiconductor memory. This storage medium 8 may be realized by a storage medium fixedly provided with the storage unit 7, or another storage medium detachably mounted on this storage unit 7. This storage medium 8 stores thereinto various data. These data are processed while the CPU 2 executes the above-explained system program, various sorts of application programs corresponding to this computer system, a document printing process program, a virtual document editing process program, a virtual document forming process program, a print preview processing program, a printing process program, a virtual printer driver program, an actual printer driver program, and also the respective process programs.

Figure 2:
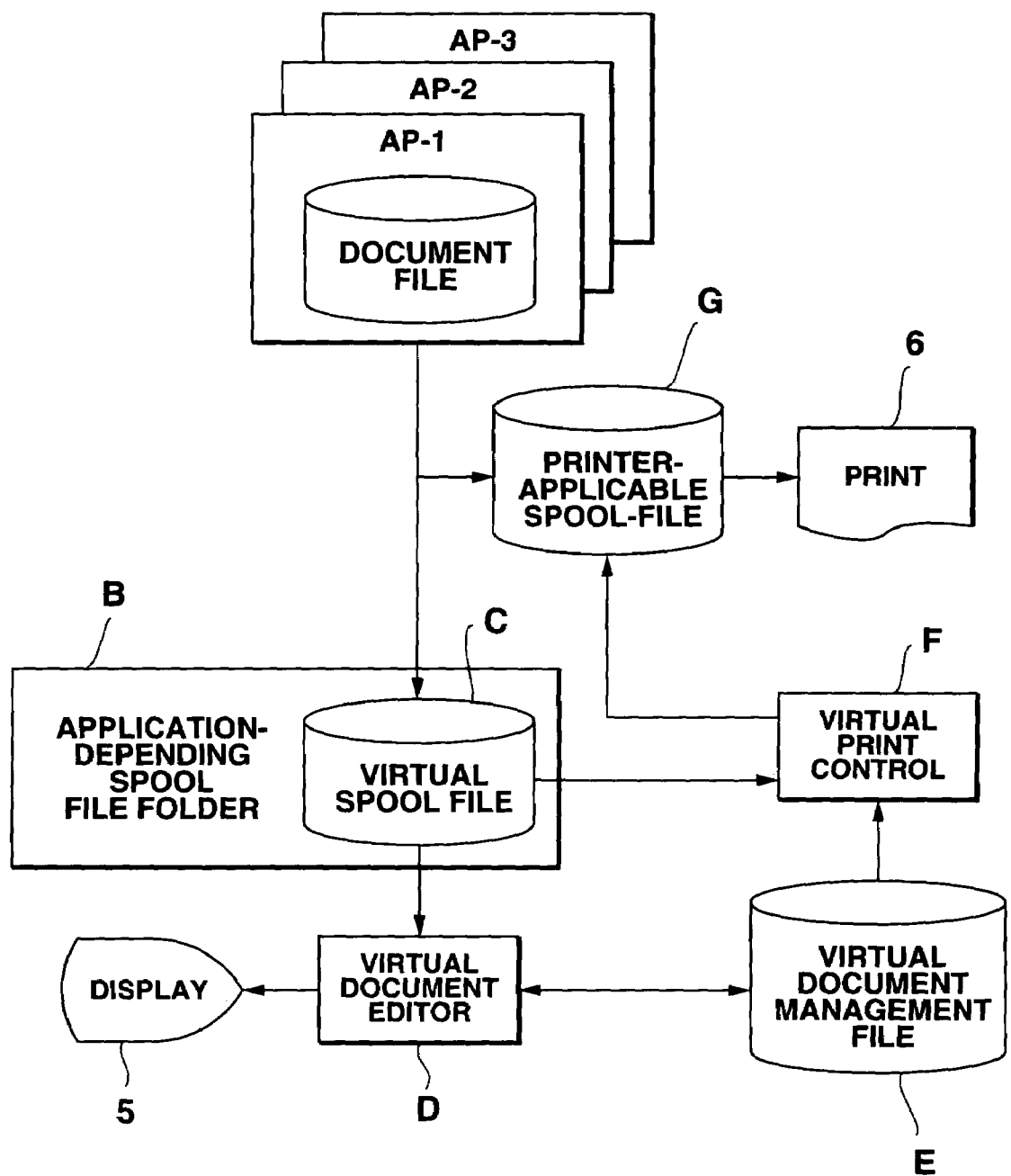
FIG. 2 is a conceptional structural diagram of a virtual document printing process operation executed by a CPU 2 employed in the computer system 1 of FIG. 1.

As indicated in FIG. 2, this storage unit 7 temporarily stores thereinto the application-depending SPOOL file folder B for saving the virtual SPOOL file C, the virtual document file E, and furthermore, the printer-applicable SPOOL file G.

It should be noted that the programs and the data stored into this storage medium 8 may be stored in such a manner that these programs and data are received from other appliances connected via a communication line and the like to this storage medium 8. Furthermore, while a storage unit equipped with the above-explained storage medium is provided with the other appliances connected via the communication line, the programs and data stored into this storage medium 8 may be used through the communication line.

Next, various operation modes of the computer system 1 shown in FIG. 1 will now be described more in detail.

Document Printing Process Operation

First, the document printing process operation executed by the above-explained CPU 2 will now be explained based upon a flow operation described in a flow chart of FIG. 3.

Figure 3:
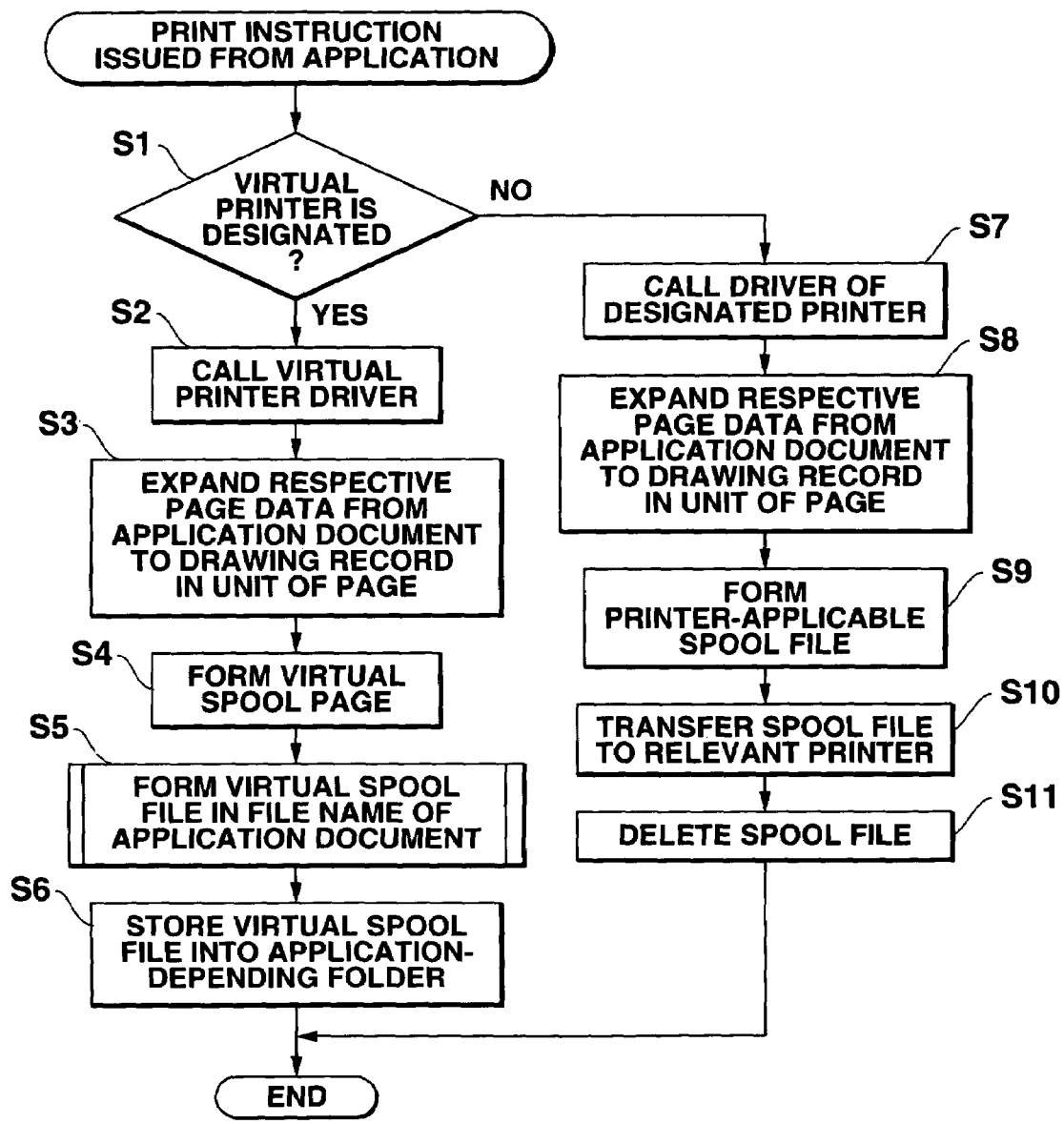
FIG. 3 is a flow chart for showing a document printing process operation executed by the CPU 2 of the computer system 1.

In the flow chart of FIG. 3, when a printing process operation is instructed from the process menu of the application programs AP-1 to AP-3 under execution, the CPU 2 firstly commences this document printing process operation, and judges as to whether or not a virtual-printer is designated (step S1). When the virtual printer is designated, the CPU 2 calls the virtual printer driver program from the storage unit 7 (step S2). Then, the CPU 2 expands the respective page data from the document files designated by the application programs AP-1 to AP-3 under initiation into drawing records in unit of a page, as indicated in FIG. 3 at a step S3. The drawing record contains a data attribute, a coordinate, a size (format), and data. Then, the CPU 2 forms a virtual SPOOL (simultaneous peripheral operation online) page record at a step S4.

Thereafter, the CPU 2 forms such a virtual SPOOL file "C" having a file name of a document file based upon each of the formed virtual SPOOL page records (step S5). Then, the CPU 2 stores the virtual SPOOL files C into the application-depending SPOOL file folder B saved in the storage unit 7, depending upon the application programs AP-1 to AP3 (step S6). Finally, this document printing process operation is accomplished.

Virtual Spool File Forming Process Operation

This virtual SPOOL file forming process operation will now be made of a flow chart shown in FIG. 14.

Figure 14:
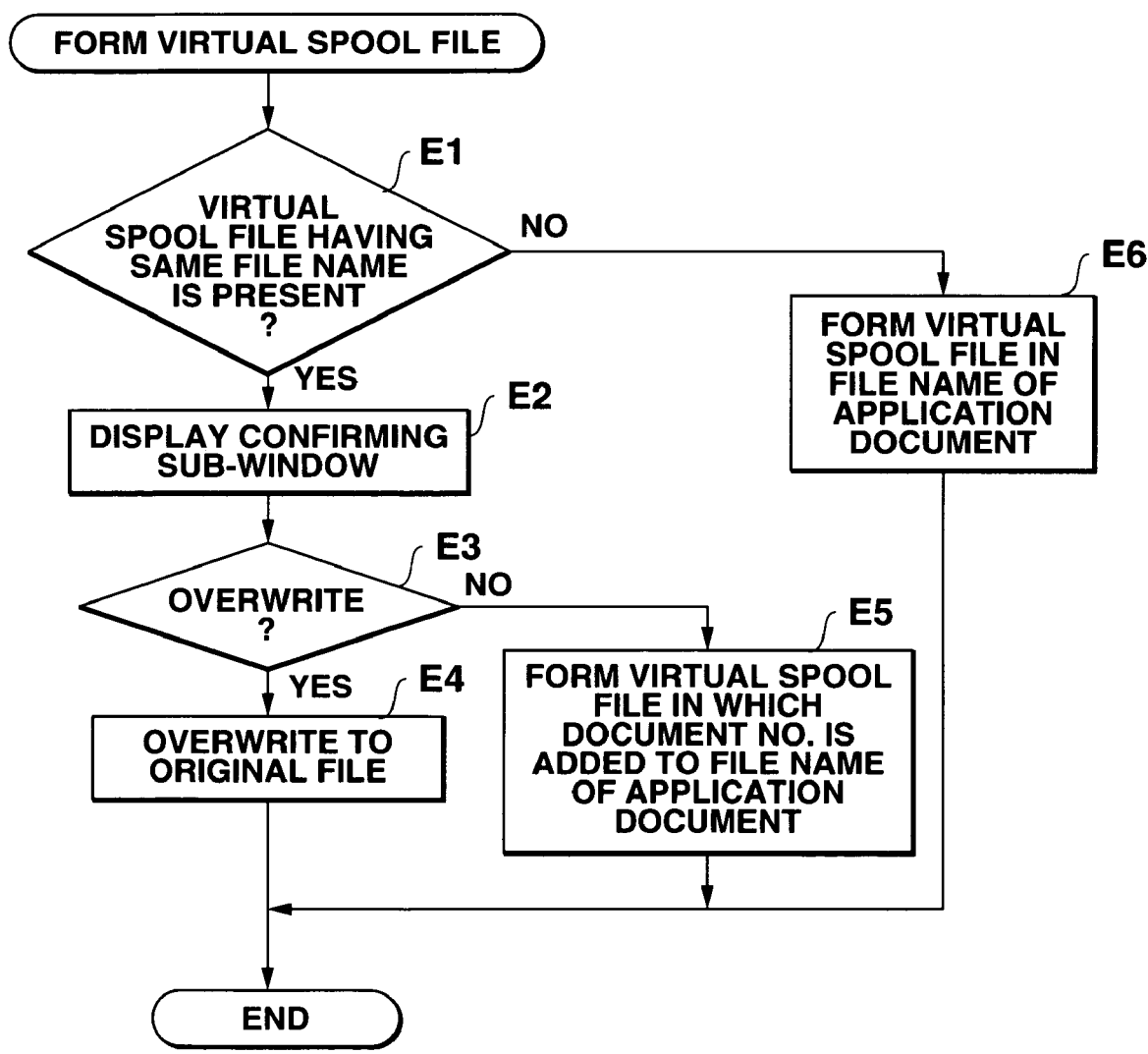
FIG. 14 is a flow chart for describing a virtual SPOOL file forming process operation executed by the CPU 2 of the computer system 1.

In FIG. 14, the CPU 2 firstly checks as to whether or not such a virtual SPOOL file "C" having the same file name as a file name of a virtual SPOOL file which is presently formed is saved in the storage unit 7 (step E1). When there is no such a virtual SPOOL file C having the same file name, the virtual SPOOL file forming process operation is advanced to a step E6. At this step E6, the CPU 2 forms a virtual SPOOL file C having a document file name of the designated application programs AP-1 to AP-3, and then this process operation is advanced to the above-explained operation defined at the step S6 of FIG. 3.

Figure 15:
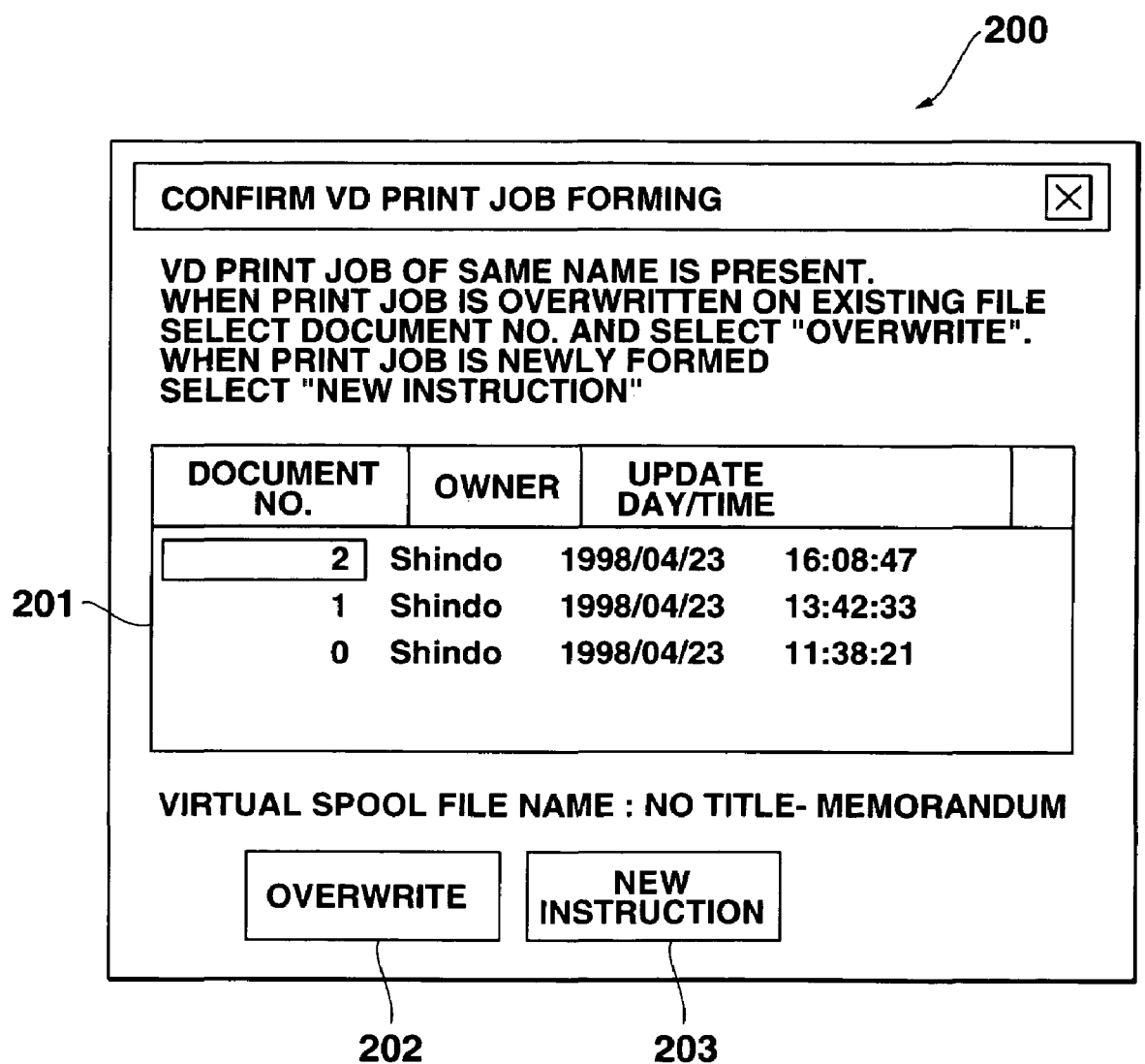
FIG. 15 illustratively indicates a file name confirming sub-window displayed while the virtual SPOOL file forming process operation of FIG. 14 is carried out.

To the contrary, when there is such a virtual SPOOL file C having the same file name in this storage unit 7, the CPU 2 displays a file name confirming sub-window 200 shown in FIG. 15 on the display unit 5 (step E2). In this file name confirming sub-window 200, a list display frame 201, an "overwrite" button 202, and a "new instruction" button 203 are arranged. In this list display frame 201, the file content of the same file name previously stored is displayed in combination of "document No.", "owner name", and "update day/time" in a list format. The overwrite button 202 is used to input an overwrite instruction. The new instruction button 203 is employed to input a new instruction.

Then, the CPU 2 confirms as to whether or not the "overwrite" button 202 is operated on the file name confirming sub-window 200 (step E3). When this overwrite button 202 is operated, the original file name is overwritten by the present document file name at a step E4. Then, this virtual SPOOL file forming process operation is advanced to the process operation defined at the step S6 of FIG. 3.

To the contrary, when the overwrite button 202 is not operated, since the new instruction button 203 is operated on the file name confirming sub-window 200, the CPU 2 forms such a virtual SPOOL file C in which a document No. is added to the document file of the designated application programs AP-1 to AP-3 (step E5), and then this file forming process operation is advanced to the process operation defined at the step S6 of FIG. 3.

As a result, in the case that the virtual printer is designated in the document printing process operation, a printed matter is not outputted, but only the virtual SPOOL file C is formed to be saved in the storage unit 7. Also, when the virtual SPOOL file c is formed, the CPU 2 can make such a selection, depending upon such a fact as to whether or not the virtual SPOOL file C having the same file name is present.

That is, the virtual SPOOL file C is formed by either overwriting the present document file name, or by using a new document file name.

Figure 4:
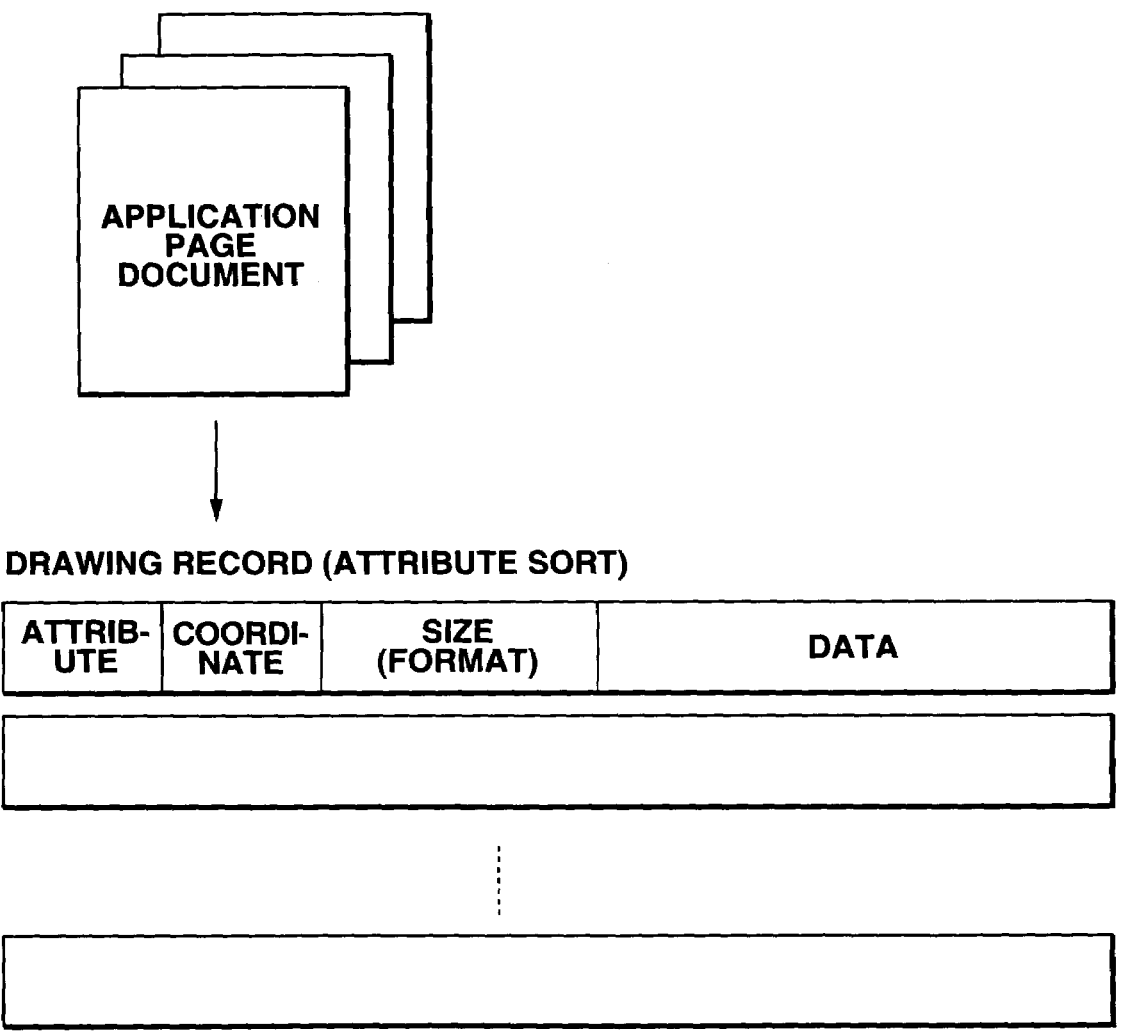
FIG. 4 is an illustration for indicating a structural example of a drawing record expanded in the virtual document printing process operation of FIG. 3.

Also, in the case that the virtual printer is not designated at the step S1 but the actual printer is designated, the process operation is advanced to a step S7. At this step S7, the CPU 2 calls the designated actual printer driver program from the storage unit 7. Then, at a step S8, as indicated in FIG. 4, the CPU 2 expands the respective page data from the document files designated by the application programs AP-1 to AP-3 under initiation into the drawing records (data attribute, coordinate, size (format), and data) in the unit of a page. Thus, the CPU 2 forms a printer-applicable SPOOL file G which corresponds to the designated printer (step S9).

Then, the CPU 2 transfers this formed printer-applicable SPOOL file to the corresponding printer, namely the print unit 6 (step S10). When the printed matter is outputted and the CPU 2 confirms the completion of the printing operation, this CPU 2 deletes the formed printer-applicable SPOOL file from the storage unit 7 (step S11). Then, this virtual SPOOL file forming process operation is accomplished.

Figure 5:
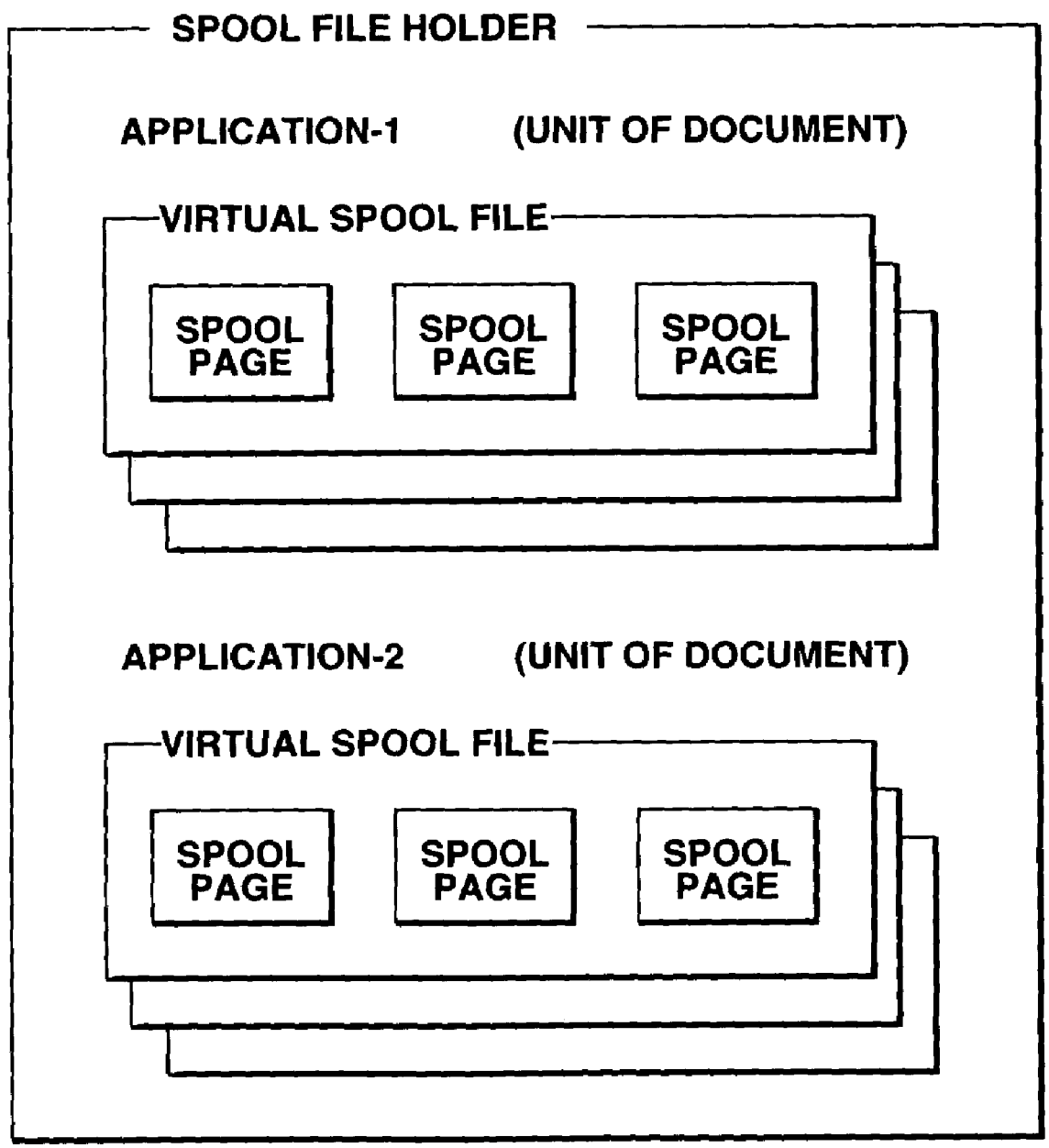
FIG. 5 illustratively shows an example of a SPOOL file folder formed in the virtual document printing process operation of FIG. 3.

As previously explained with respect to the document printing operation, when the virtual printer is designated, as shown in FIG. 5, the virtual SPOOL file C corresponding to the application programs AP-1 to AP-3 is formed in the unit of the document file name and thereafter is saved in the storage unit 7. Subsequently, a virtual document editing process operation is executed by the CPU 2 while utilizing this virtual SPOOL file C.

Virtual Document Editing Process Operation

Referring now to a flow chart shown in FIG. 6, a description will be made of the virtual document editing process operation executed under control of the CPU 2.

Figure 6:
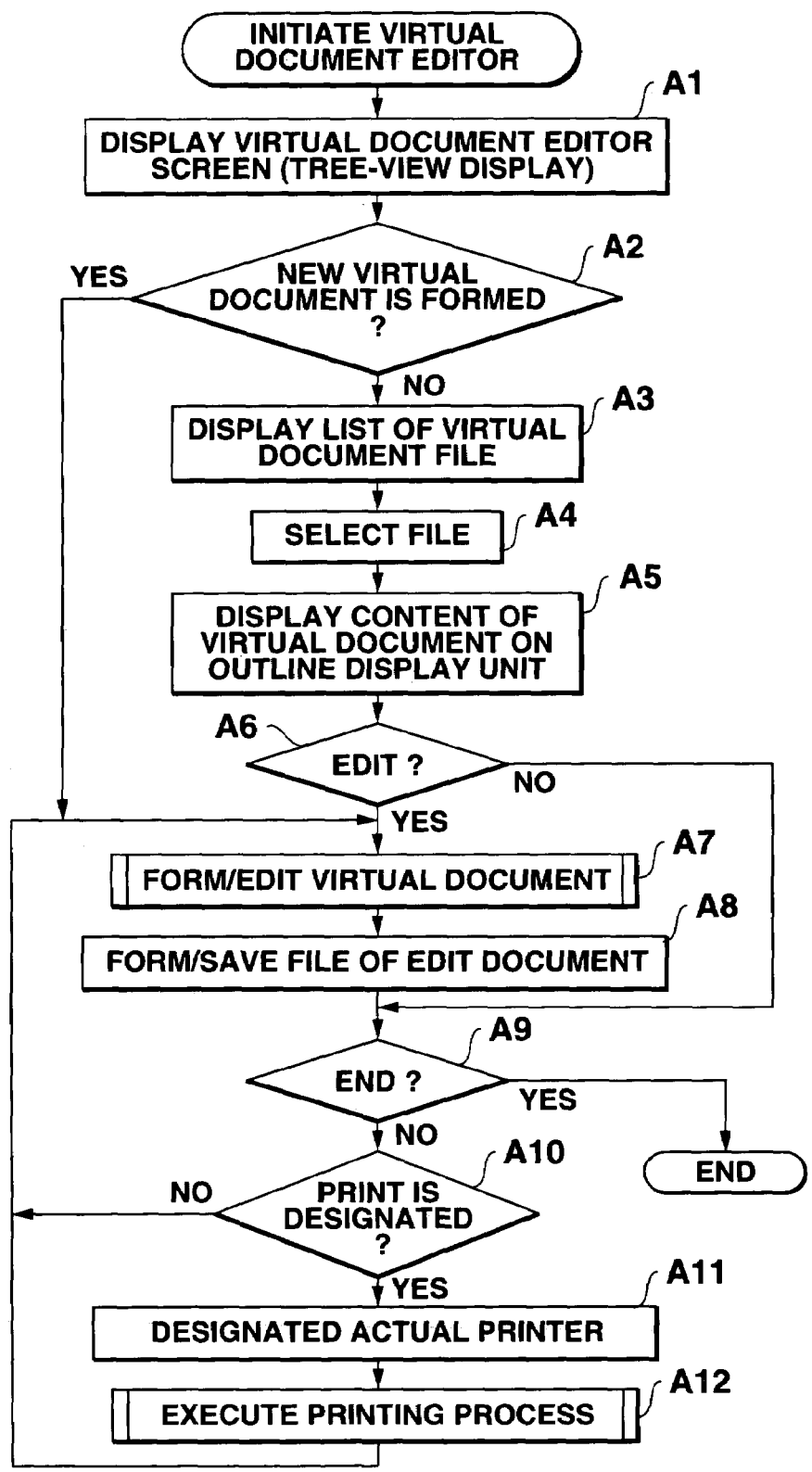
FIG. 6 is a flow chart for describing a virtual document editing process operation executed by the CPU 2 of FIG. 1.
Figure 7:
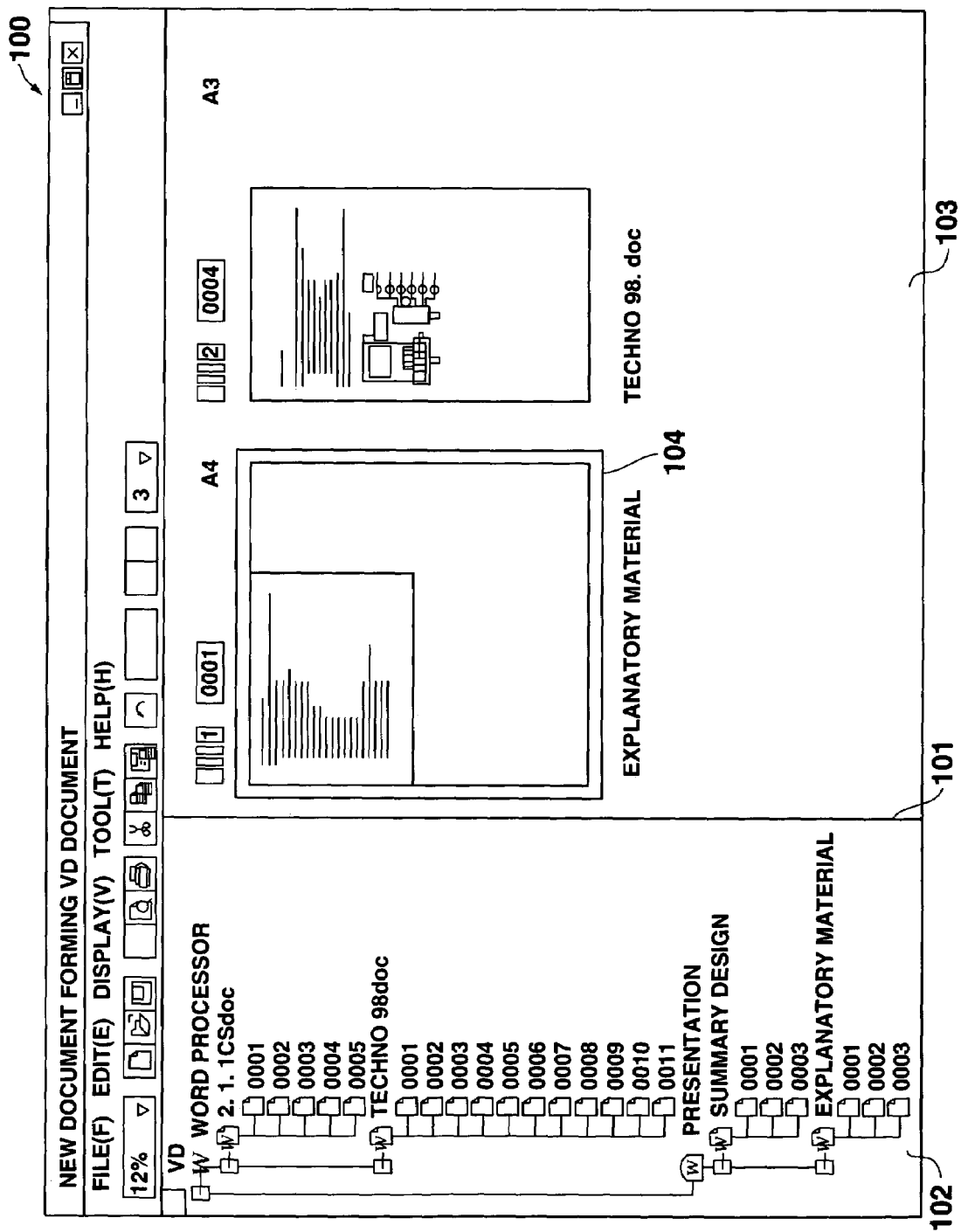
FIG. 7 illustratively represents a virtual document editor screen displayed in the virtual document editing process operation of FIG. 6.

In FIG. 6, when an initiation of a virtual document editor is instructed from the process menu of the application programs AP-1 to AP-3 under initiation, the CPU 2 commences this virtual document editing process operation, and then displays a virtual document editor screen 100 as shown in FIG. 7 on the display unit 5 (step A1).

In this virtual document editor screen 100, a bar-shaped splitter 101, a tree-view display portion 102, an outline display portion 103, and an outline display frame 104 are set. This bar-shaped splitter 101 splits the virtual document editor screen 100 into right and left editor screen portions. The tree-view display portion 102 displays contents of pages in a tree-structured shape while setting the contents of the virtual SPOOL file C as virtual document folders, depending upon application programs (wordprocessor, presentation material and the like). The outline display portion 103 displays an outline of a content of a virtual document folder moved from the tree-view display portion 102. Also, the outline display frame 104 displays subject pages in a discriminative manner within the outline display portion 103.

Subsequently, the CPU 2 judges as to whether or not "new virtual document forming" is instructed form an edition pull-down menu (not shown in detail) on this virtual document editor screen 100 (step A2). When "new virtual document forming" is instructed, this virtual document editing process operation is advanced to a virtual document forming/editing process operation defined at a step A7. To the contrary, when "new virtual document forming" is not instructed, as indicated in the tree-view display unit 102 of FIG. 7, the CPU 2 displays a list in a folder format in the tree-structured shape (step A3). This list indicates the page contents of the virtual document folders (virtual SPOOL file C), depending upon the application programs.

A desired virtual document folder is selected from this tree-view display portion 102 to the outline display portion 103 by way of a "drag-and-drop" operation at a step A4. When the selected desirable virtual document folder is moved to the outline display portion 103, as shown in FIG. 7, the CPU 2 sets the content of the virtual document folder selected to the outline display unit 103 into the outline display frame 104, and then displays the outline of this folder content (step A5).

Then, the CPU 2 checks as to whether or not "edit" is instructed from the edit pull-down menu at a step A6. When "edit" is not instructed, the process operation is advanced to a step A9. To the contrary, when "edit" is instructed, the virtual document forming/editing process operation is carried out (step A7).

Virtual Document Forming/Editing Process Operation

Figure 8:
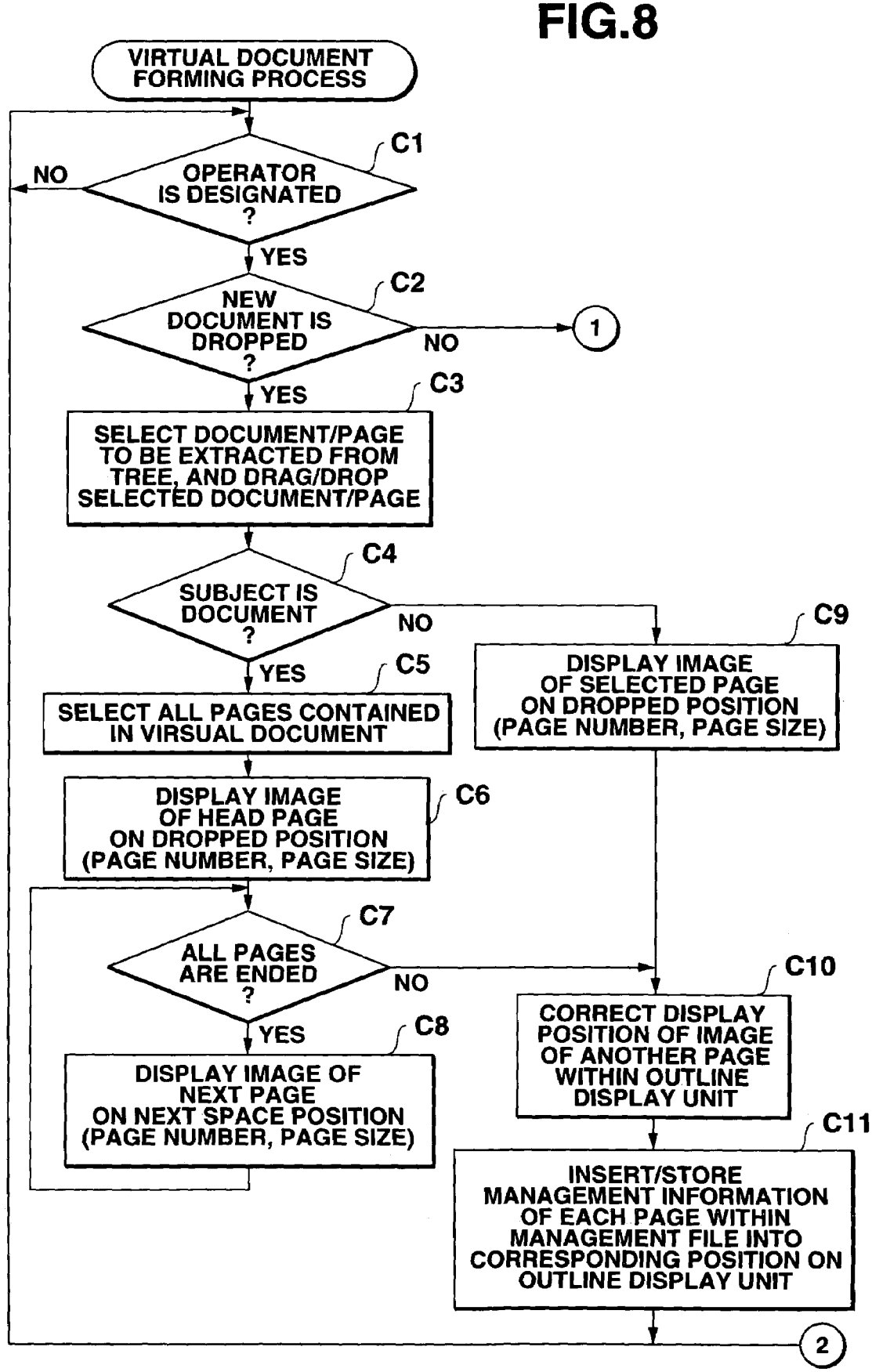
FIG. 8 is a flow chart for describing a portion of a virtual document forming process operation executed by the CPU 2 of the computer system 1.
Figure 9:
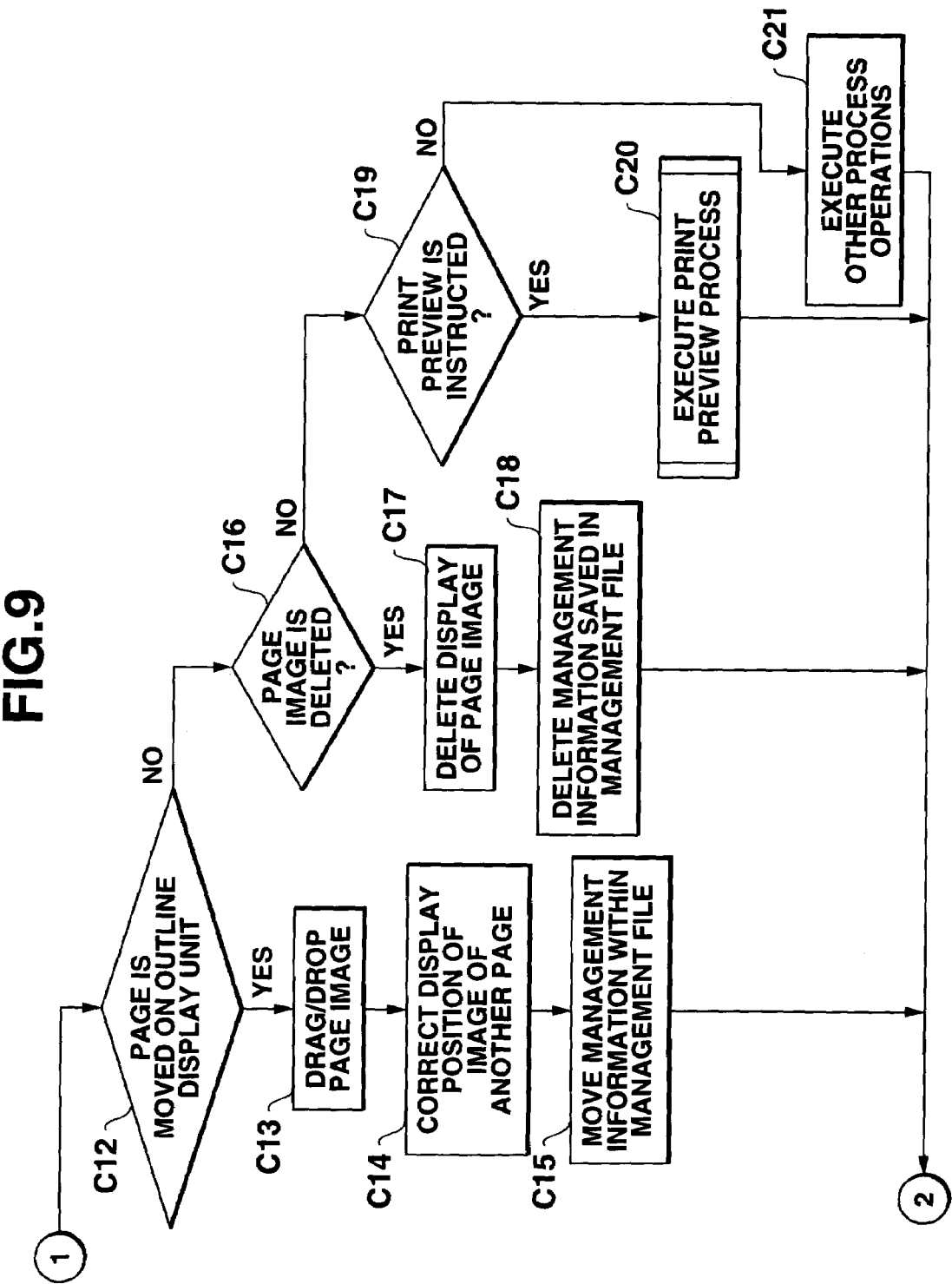
FIG. 9 is a flow chart for describing the remaining portion of the above-described virtual document forming process operation shown in FIG. 8.

Referring to flow charts indicated in FIG. 8 and FIG. 9, this virtual document forming/edit process operation is explained as follows:

In FIG. 8, the CPU 2 confirms as to whether or not an instruction is issued from the input unit 3 by the operator at a first step C1. When such an instruction is issued, the CPU 2 further checks as to whether or not this instruction corresponds to a drop instruction of a new virtual document folder (step C2). If this instruction is not such a drop instruction of the new virtual document folder, then this virtual document forming/editing process operation is advanced to a process operation defined at a step C12. To the contrary, when this instruction corresponds to the drop instruction of the new virtual document folder the CPU 2 selects a virtual document folder (containing page content) which is newly extracted from the tree-view display unit 102 of FIG. 7. The selected virtual document folder is moved to the outline display portion 103 by way of the "drag-and-drop" operation. (step C3).

Next, the CPU 2 judges as to whether or not the newly dropped virtual document folder corresponds to a document at a step C4. When this newly dropped virtual document folder is the document, the CPU 2 selects all of the virtual document page records stored in this virtual document folder (step C5), and then reads out a virtual SPOOL page record corresponding to this selected virtual document page record based upon management information of a virtual document page record at a top position thereof. Then, as indicated in FIG. 7, the CPU 2 displays an image of this virtual SPOOL page within the outline display frame 104, while setting the outline display frame 104 at the drop position in combination with this page number and the paper size (step C6).

Then, the CPU 2 confirms as to whether or not the image display operations of all of the virtual document pages (all of virtual SPOOL pages records) contained in this virtual document folder are completed at a step C7. When the image display operations are not yet accomplished, the CPU 2 reads out the next corresponding virtual SPOOL page record from the virtual SPOOL file C based upon the management information of the management information of the next virtual SPOOL page record, and then displays a page image of this next virtual SPOOL page record within the outline display frame 104, while setting this outline display frame 104 at a drop position in combination with the page number thereof and the paper size thereof (step C8). The above-explained process operations defined at these steps C7 and C8 are repeatedly carried out until the image display operations of all of the virtual document pages contained in the virtual document folder are ended.

On the other hand, when the newly dropped virtual document folder does not correspond to the document at the step C4, since this document folder corresponds to an image, reads out a virtual SPOOL page record corresponding thereto from the virtual SPOOL file "c" based upon management information of the selected virtual document page. Then, as indicated in FIG. 7, the CPU 2 displays an image of this virtual SPOOL page within the outline display frame 104, while setting this outline display frame 104 at the drop position in combination with this page number and the paper size (step C9).

Then, when either the display process operations of all of the virtual document pages (all of virtual SPOOL page records) of the selected document are accomplished, or the display operation of the virtual document page (virtual SPOOL page record) of the selected record is ended, the CPU 2 corrects the display position of the image of another virtual document page (virtual SPOOL page record) under display within the outline display portion 103.

On the other hand, the following outline is displayed on the outline display portion 103 of FIG. 7. That is, an "explanatory material" virtual document folder is selected from the application program "presentation" within the tree-view display portion 102, and then an image of a "001" virtual document page thereof (virtual SPOOL page record) is displayed in combination with a page number "0001" and a paper size "A4" within the outline display frame 104. This outline display frame 104 is set to the drop position within the outline display portion 103. Also, another image is displayed in an outline form at a right side position of this outline display frame 104. That is, an image of a "004" virtual document page (virtual SPOOL page record) of a "Techno 98.doc" virtual document folder which has been previously selected from the application program "word processor" is displayed in the outline form in combination with a page number "0004" and a page size "A3".

Figure 10A:
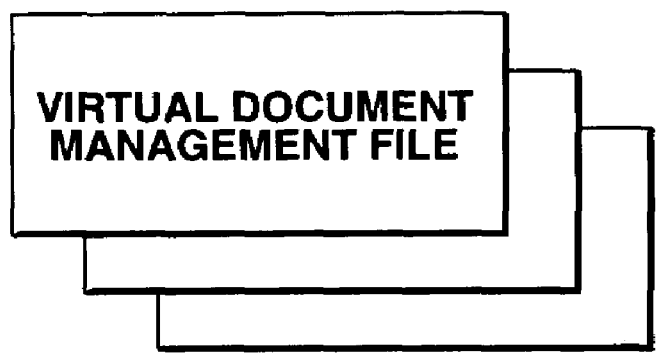
FIGS. 10A and 10B illustratively represent structural examples a virtual document management file E formed in the virtual document forming process operation of FIG. 8 and FIG. 9.
Figure 10B:
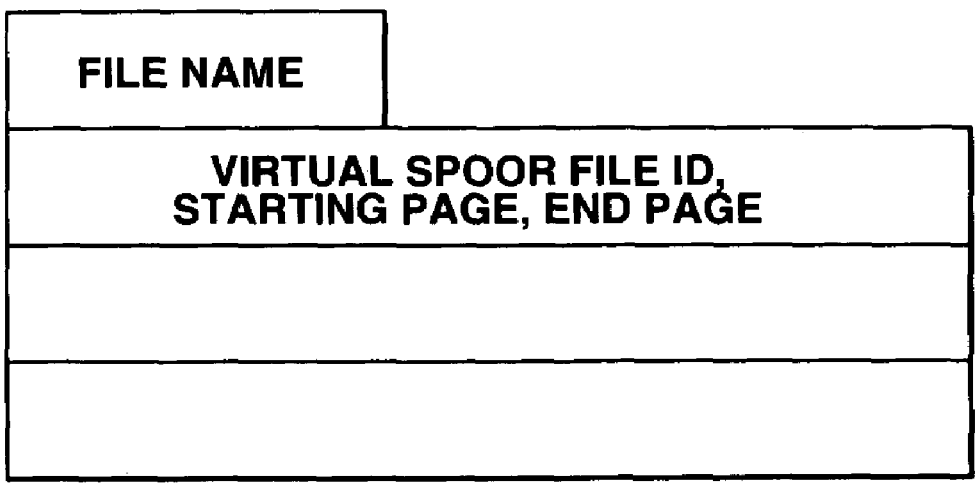

Then, the CPU 2 inserts/stores page management information of a virtual document page at a storage position corresponding to the display position on the outline display portion 103 within the virtual document management file E shown in FIG. 10B (step C11). This virtual-document management file E is saved in a virtual document management file folder shown in FIG. 10A. This virtual document management file folder manages a content (virtual SPOOL file. ID, starting page, end page) of each of the virtual SPOOL page records within the respective virtual document folders displayed in the outline display portion 103. Thereafter, this editing process operation is returned to the process operation defined at the step C1. In other words, the storage position of the management information is updated in response to the display position of the respective page images on the outline display portion 103. This management information manages each of the virtual SPOOL page records contained in the virtual document management file E.

When the instruction issued at the step C2 does not correspond to the drop instruction of the newly produced document folder, the process operation is advanced to a step C12. At this step C12, the CPU 2 checks as to whether or not the page is moved on the outline display portion 103. If this page is not moved on the outline display portion 103, then the process operation is advanced to a process operation of a step C16. To the contrary, if this page is moved, then the image of this page is drag/drop-operated within the outline display portion 103. As a result, when the display positions of the subject page images are rearranged in the virtual document folder under display (step C13), the CPU 2 corrects the display position of other page images (step C14). Then, the CPU 2 moves the storage positions of the respective page management information saved in the virtual document management file E which is stored in the virtual document management file folders shown in FIG. 10A and FIG. 10B (step C15). Then, the process operation is returned to the process operations defined at the step C1.

When the instruction content of the step C12 does not correspond to the page movement on the outline display portion 103, the process operation is advanced to the step C16. At this step C16, the CPU 2 checks as to whether or not the page image is deleted. When the instruction content does not correspond to the page image deletion, the process operation is advanced to a step C19. Conversely, when the instruction content corresponds to the page image delation, the CPU 2 deletes the indication of the page image from the outline display portion 103, and this page image is instructed to be deleted (step C17). Then, the CPU 2 deletes the page management information of this deleted page from the virtual document management file E stored in the virtual document management folders shown in FIG. 10A and FIG. 10B (step C18). Thereafter, the process operation is returned to the previous step C1.

When the instruction content is not equal to the deletion of the page image at a step C19, the process operation is advanced to a step C19 at which the CPU 2 checks as to whether or not "print preview" is instructed. When the print preview instruction is not issued, the CPU 2 executes other process operation in response to other instructions (step C21), and then the process operation is returned to the previous process operation defined at the step C1. When the print preview instruction is issued, the CPU 2 executes a print preview process operation of a designated page image.

Print Preview Process Operation

Next, this print preview process operation will now be explained with reference to a flow chart of FIG. 12.

Figure 11A:
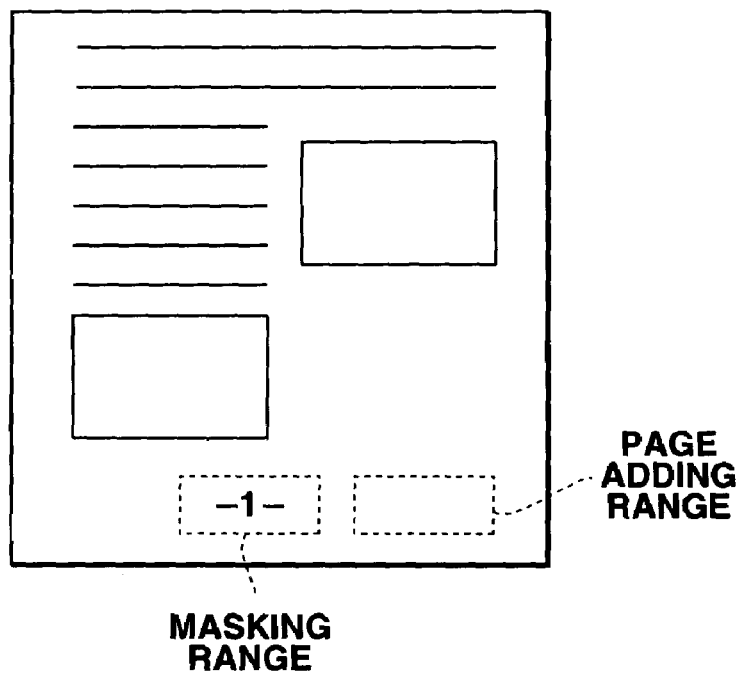
FIGS. 11A and 11B illustratively show other structural examples of a virtual document management file E formed in the virtual document forming process operation of FIG. 8 and FIG. 9.
Figure 12:
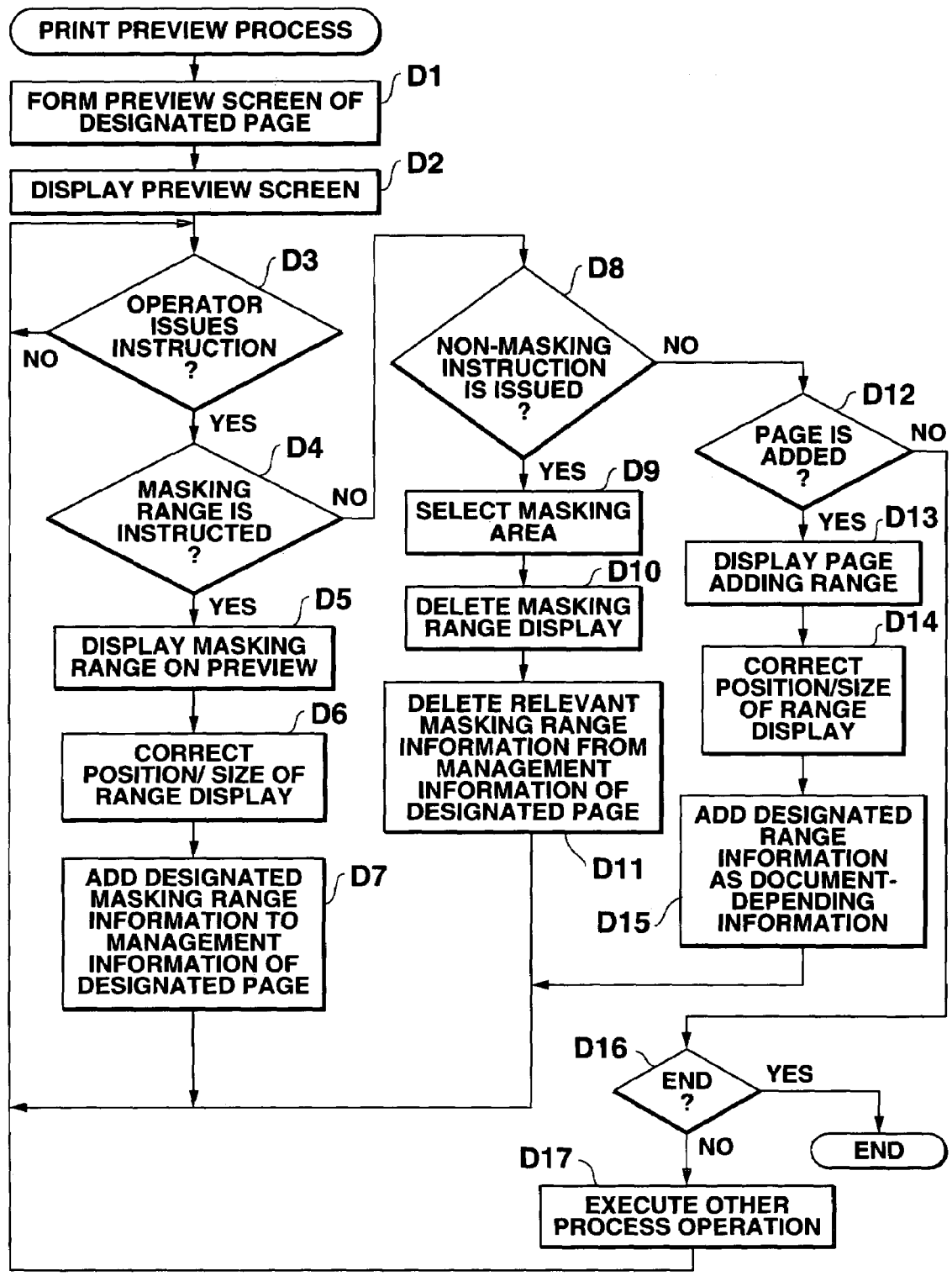
FIG. 12 is a flow chart for describing a print preview process operation executed by the CPU 2 of the computer system 1.

At a first step D1 of FIG. 12, the CPU 2 forms a print preview screen of a designated page. Thereafter, the CPU 2 displays this print preview on the display unit 5 at a step D2. Then, the CPU 2 checks as to whether or not an instruction is issued by the operator via the input unit 3 (step D3). When such an instruction is issued, the CPU 2 judges as to whether or not this instruction content corresponds to a masking instruction (step D4). To the contrary, if this instruction is not such a masking instruction, then the process operation is advanced to a step D8 at which the CPU 2 executes the process operation thereof. To the contrary, when the masking instruction is issued, as represented in FIG. 11A, a masking range is displayed on the print preview screen (step D5), and both a position and a size of this masking range are corrected in response to the operation of the operator (step D6).

Figure 11B:
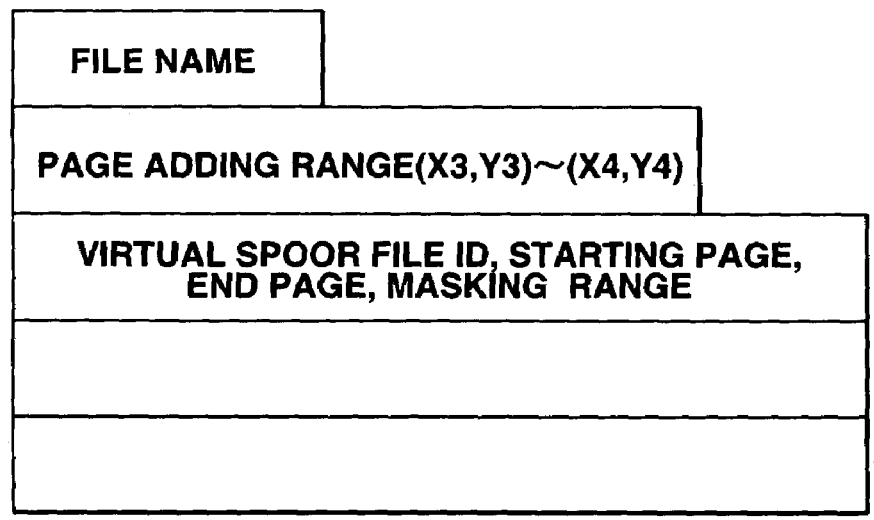

When both the display position and the size of the masking range are corrected in response to the operation of the operator, the CPU 2 adds this designated masking range information to management information of a designated page within the virtual document management file E (step D7), as represented in FIG. 11B. Thereafter, this print preview process operation is returned to the process operation defined at the step D3. As indicated in FIG. 11B, as the designated masking range information, "masking range (X1, Y1) to (X2, Y2)" is additionally provided with the management information of the designated page within the virtual document management file E.

To the contrary, if the masking instruction is not issued at the step D4, then the process operation is advanced to a process operation defined at a step D8 where the CPU 2 checks as to whether or not a non-masking instruction is entered. When the non-masking instruction is not issued, the process operation is advanced to a process operation defined at the step D12, whereas when the non-masking instruction is issued, the CPU 2 selects such a masking area which is preset on the print preview screen (step D9), and deletes this masking range display (step D10). Then, the CPU 2 deletes the relevant masking range information from the management information of the designated page within the virtual document management file E (step D11). Then, the process operation is returned to the process operation defined at the step D3.

To the contrary, when the non-masking instruction is not issued at the step D8, the process operation is advanced to a process operation defined at a step D12. At this step D12, the CPU 2 checks as to whether or not a page adding instruction is entered. When the page adding instruction is issued, the CPU 2 displays a page adding range oh the print preview screen, as shown in FIG. 11A (step D13). Both a display position and a display size of this page adding range are corrected in response to an operation of the operator (step D14). When the display position and the display size of the page adding range are corrected in response to the operation of the operator, the CPU 2 adds this designated page adding range information to the management information of the designated page within the virtual document management file E (step D15). Then, the process operation is returned to the process operation defined at the step D3.

Also, when the page adding instruction is not issued at the step D12, the CPU 2 checks at a step D16 as to whether or not an end instruction is entered. When the end instruction is issued, this print preview processing operation is accomplished. To the contrary, when no end instruction is issued, the CPU 2 executes other process operation in response to other instructions (step D17). Thereafter, the print preview process operation is returned to the process operation defined at the step D3. When this print preview process operation is ended, the process operation is returned to the process operation defined at the step C1 of FIG. 9.

As previously explained, in the virtual document forming/editing process operation, the page structure of the virtual document page can be edited, and furthermore, both the masking range and the page adding range within the page image can be set. When this virtual document forming/editing process operation is accomplished, the process operation by the CPU 2 is again returned to the process operation defined at the step A8 of FIG. 6. At this step A8, the virtual, document management file E formed in the virtual document forming/editing process operation is saved in the virtual document management file folder.

Then, the CPU 2 judges as to whether or not the end instruction is inputted (step A9). If the end instruction is entered, then this virtual document editing process operation is accomplished. To the contrary, when the end instruction is not entered, the CPU 2 checks as to whether or not the print instruction is issued (step A10). When the print instruction is not entered, the process operation is returned to the above-explained virtual document forming/editing process operation defined at the step A7, whereas when this print instruction is issued, the CPU 2 designates the print unit 6 equal to the actual printer (step A11) so as to execute the printing process operation.

Printing Process Operation

This printing process operation will now be explained with reference to a flow chart shown in FIG. 13.

Figure 13:
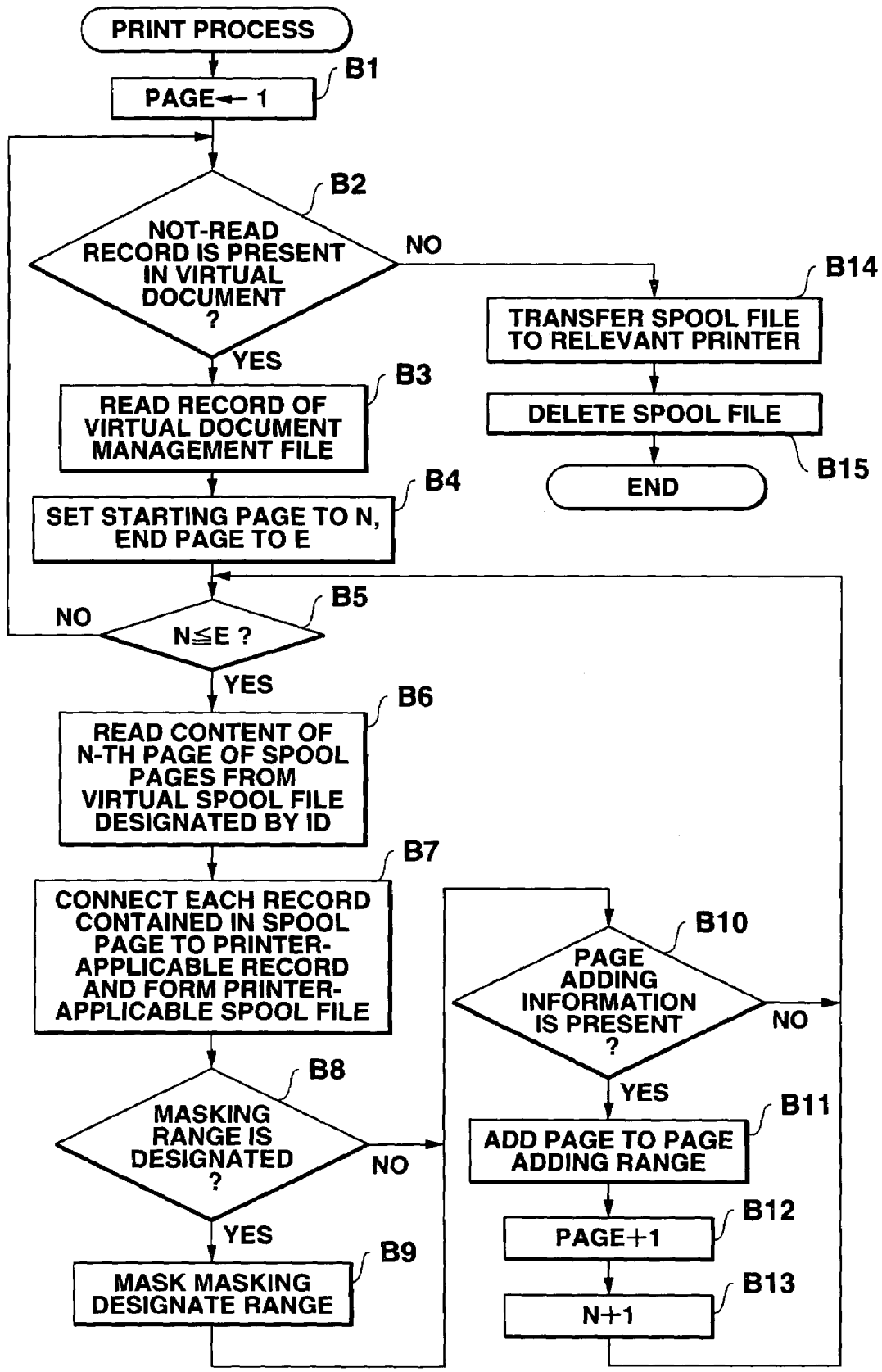
FIG. 13 is a flow chart for describing a print process operation executed by the CPU 2 of the computer system 1.

In FIG. 13, the CPU 2 firstly sets "Page" as a parameter to the RAM 4, and sets "1" to this parameter "Page" (step B1). The parameter "Page" is used to manage a print page number. Subsequently, the CPU 2 judges as to whether or not a virtual document page record which is not yet read out is present in a virtual document management file E (step B2). The print instruction is issued to this virtual document management file E. When there is no virtual document page record which is not yet read out, this printing process operation is advanced to a process operation defined at a step B14. To the contrary, when there is such a virtual document page record which is not yet read out in the virtual document management file E, the CPU 2 sets both "N ← starting page" and "E ← end page" into the RAM 4 as parameters (step B4). The parameter "N ← starting page" is used to manage a starting page of this virtual document, and the parameter "N ← end page" is used to manage an ending page based upon the virtual document page number within this virtual document management file E.

Next, the CPU 2 judges as to whether or not the page number N of the read virtual document page record is smaller than, or equal to the end page E (step B5). If the page number N of the read virtual document page record is not smaller than, or equal to the end page E, then this printing process operation is returned to the previous process operation defined at the step B2. Conversely, when the page number N is smaller than, or equal to the end page E, the CPU 2 reads out an N-th page of relevant virtual SPOOL page records from a virtual SPOOL file C (step B6). This virtual SPOOL file C is designated by a virtual SPOOL file ID set in this virtual document page record.

Then, the CPU 2 converts the N-th page of the read virtual SPOOL page records into a printer-applicable SPOOL record corresponding to the print unit 6 functioning as the the ending page E. When the page numbers N are smaller than, or equal to the end page E, the CPU 2 reads out next pages "N" of virtual SPOOL page records from the virtual SPOOL file C, and executes the process operations defined from the above-explained steps B7 to B13. As a consequence, the CPU 2 repeatedly executes the above-explained process operations defined from the step B6 to the step B13 until the page numbers N exceed the end page E, and saves the printer-applicable SPOOL file G formed based upon the designated virtual document management file into the storage unit 7. When the page numbers N exceed the end page E, the printing process operation is returned to the process operation defined at the step B2.

Also, when there is no such a non-read virtual document page record at the step B2, the CPU 2 transfers the presently produced printer-applicable SPOOL file G saved in the storage unit 7 to the print apparatus 6 so as to print out (step B14). When the CPU 2 confirms that the printing operation is accomplished in the print apparatus 6, the CPU 2 deletes the presently saved printer-applicable SPOOL file G (step B15). Then, this printing process operation is accomplished, and the process operation is returned to the previous step A7 of FIG. 6.

As previously described in detail, in the computer system 1 according to this embodiment mode, the virtual document editing function and the virtual document management file forming/editing function are provided. That is, in accordance with this virtual document editing function, while such print data having plural sorts of data (for example, document and actual printer, and forms a printer-applicable SPOOL file G (step B7). Also, the CPU 2 confirms as to whether or not masking range information is set to the N-th page of virtual document page records (step B8). When this masking range information is not set, the printing process operation is advanced to a process operation defined at a step B10. To the contrary, when the masking range information is set, the CPU 2 forms a printer-applicable command in such a manner that this relevant page of the designate range is masked in correspondence with this masking-range information (step B9). For instance, the masking range is overwritten in a while color.

In the case that the masking range information is not set at the step B6, and after the process operation defined at the step B9 has been executed, the CPU 2 confirms as to whether or not the page adding information is set to the N-th page of the virtual document page records read at the above step B10. When the page adding information is not set, the printing process operation is returned to the previous process operation defined at the step B5. To the contrary, when the page adding information is set, the CPU 2 produces a printer-applicable command in such a manner that the sequential page information is added to this designated range (step B11).

Then, the CPU 2 adds "1" to the parameter "Page" set into the RAM 4 in the process operation defined at the step B1 (step B12), and furthermore adds "1" to the starting page N (step B13). Then, the process operation is returned to the previous step B5. At this step B5, the CPU 2 judges as to whether or not the page numbers N is smaller than, or equal to image being contained) are printed as a single document file and these plural sorts of data are previously formed based upon a plurality of application programs AP-1 to AP-3, desired document pages are selected in the "drag-and-drop" operation on the virtual document editor screen 100 by designating the virtual printer mode by the operator. Thus, the virtual SPOOL file C by which these desirable document pages can be managed in he batch mode is formed and saved.

Then, this computer system 1 is further provided with the printing process function. That is, when the actual printing operation is carried out, the printer-applicable SPOOL file G applicable to the actual printer is formed based upon both the saved virtual SPOOL file C and the virtual document management file E. This printer-applicable SPOOL file G is transferred to the print unit 6 so as to perform the actual printing operation. After the actual printing operation is carried out, this printer-applicable SPOOL file G is deleted.

As a consequence, such a cumbersome operation can be deprived from the operator's work in which the operator initiates the application program every document page and must set the printing condition. As a result, the work sequence during the printing operation can be simplified, and the print work efficiency can be improved. Also, since the page information is newly added to each of the virtual SPOOL pages by masking the original page, a serial page number can be simply applied. The cumbersome operation in which the page sequence of the printed matters is rearranged can be omitted.

In addition, in the above-described embodiment, when the virtual printer is designated while printing out the document formed by the application programs AP-1 to AP-3, the virtual SPOOL file C corresponding to the print object is formed to be SPOOL-stored. As a result, when the actual printing operation is carried out, the printed matter can be outputted without producing the print object, but by merely reading the corresponding virtual SPOOL file C. After all, the actual printing process operation time can be shortened.

Also, in accordance with the embodiment mode, when the virtual SPOOL file C is formed, the following selection can be made, depending on such a fact as to whether or not the virtual SPOOL file C having the same file name is present. That is, this virtual SPOOL file C is formed by overwriting the present document file name, or is formed in the name of the new document file. As a result, the operator can simply judges as to whether or not the virtual SPOOL file is reflected on the document for combining/managing the changed contents of the original documents.

In the above embodiment mode, the virtual document management file E is formed on the virtual document editor screen 100 by "drag-and drop"-operating the virtual document page from the tree-view display portion 102 to the outline display portion 103. Alternatively, the virtual document management file may be formed by moving and deleting the icon on the tree-view display portion 102.

In the above-explained embodiment mode, when the virtual document management file E is produced, only the management information is stored, and the actual data is independently saved from the virtual SPOOL file C to be stored. Alternatively, a necessary page may be extracted from such a SPOOL file required to form a document, and then may be managed/stored, depending upon the virtual document.

What is claimed is:

1. A document processing apparatus comprising:

judging means for judging whether a virtual printer or an actual printer is designated when a printing process operation of document data is selected;

print control means for printing said document data on the actual printer when said judging means judges that the actual printer is designated;

document data obtaining means for obtaining said document data as virtual document data when said judging means judges that the virtual printer is designated;

storage means for storing a plurality of items of the virtual document data obtained by the document data obtaining means, said plurality of items of virtual document data being formed from respective documents created using different types of application programs and by designating the virtual printer;

display means for displaying the plurality of items of virtual document data stored in the storage means;

editing means for selecting respective plural individual pages to form an output virtual document to be outputted, from a plurality of individual pages included in the plurality of items of virtual document data displayed on the display means, and for designating an output page order for the selected individual pages in the output virtual document; and controlling means for: (i) reading out each of the selected individual pages of the virtual document data from the storage means, (ii) correcting a specific page number of each read out page of the virtual document data to a pare number which corresponds to a position of the read out page in the output page order, and (iii) outputting the respective pages of the virtual document data with the specific page numbers corrected to the new page numbers.

2. The document processing apparatus as claimed in claim 1, wherein the controlling means masks the specific page number provided in the virtual document data and adds the new page number at an area for the page number based on the position in the output page order.

3. A document processing apparatus comprising:

judging means for judging whether a virtual printer or an actual printer is designated when a printing process operation of document data is selected;

print control means for printing said document data on the actual printer when said judging means judges that the actual printer is designated;

converting means for, when the judging means judges that the virtual printer is designated, converting the document data into a drawing record so as to form virtual document data;

storage means for storing a plurality of items of the virtual document data converted by the converting means, said plurality of items of virtual document data being formed from respective documents created using different types of application programs to have specific page numbers formed by the application programs;

instruction means for instructing editing of the virtual document data;

displaying means for displaying page information included in the virtual document data stored in the storage means, when the editing of the virtual document is instructed by the instruction means;

editing means for editing page positions of output virtual document data to be outputted, based on the page information of the virtual document data displayed on the display means; and controlling means for outputting the output virtual document data edited by the editing means in accordance with the edited page positions.

4. The document processing apparatus as claimed in claim 3, wherein:

the displaying means displays icons representing the respective page information; and the editing means edits the pages to be included in the virtual document by manipulating the icons displayed on the displaying means.

5. A computer readable program code embodied on a computer readable medium, the execution of said code by a computer causing said computer to perform processes comprising:

judging whether a virtual printer or an actual printer is designated when a printing process operation of document data is selected;

printing said document data on the actual printer when said judging means judges that the actual printer is designated;

obtaining said document data as virtual document data when it is judged that the virtual printer is designated;

storing a plurality of items of the virtual document data, said plurality of items of virtual document data being formed from respective documents created using different types of application programs and by designating the virtual printer;

displaying said stored plurality of items of virtual document data;

selecting respective plural individual pages to form an output virtual document to be outputted, from a plurality of individual pages included in the plurality of displayed items of virtual document data, and for designating an output page order for the selected individual pages in the output virtual document; and a controlling process including: (i) reading out each of the selected individual pages of the stored virtual document data, (ii) correcting a specific page number of each read out page of the virtual document data to a page number which corresponds to a position of the read out page in the output page order, and (iii) outputting the respective pages of the virtual document data with the specific page numbers corrected to the new page numbers.

6. A computer readable program code embodied on a computer readable medium, the execution of said code by a computer causing said computer to perform processes comprising:

judging whether a virtual printer or an actual printer is designated when a printing process operation of document data is selected;

printing said document data on the actual printer when said judging means judges that the actual printer is designated;

converting, when it is judged that the virtual printer is designated, the document data into a drawing record so as to form virtual document data;

storing a plurality of items of the converted virtual document data, said plurality of items of virtual document data being formed from respective documents created using different types of application programs to have specific page numbers formed by the application programs;

instructing editing of the virtual document data;

displaying page information included in the stored virtual document data, when the editing of the virtual document is instructed;

editing page positions of output virtual document data to be outputted, based on the displayed page information of the virtual document data; and outputting the edited output virtual document data in accordance with the edited page positions.

* * * * *